M. GERASHSHENEVSKY.
RELIEF MAP.
APPLICATION FILED MAR. 5, 1918.
1,278,632.
Patented Sept. 10, 1918.
2 SHEETS—SHEET 1.
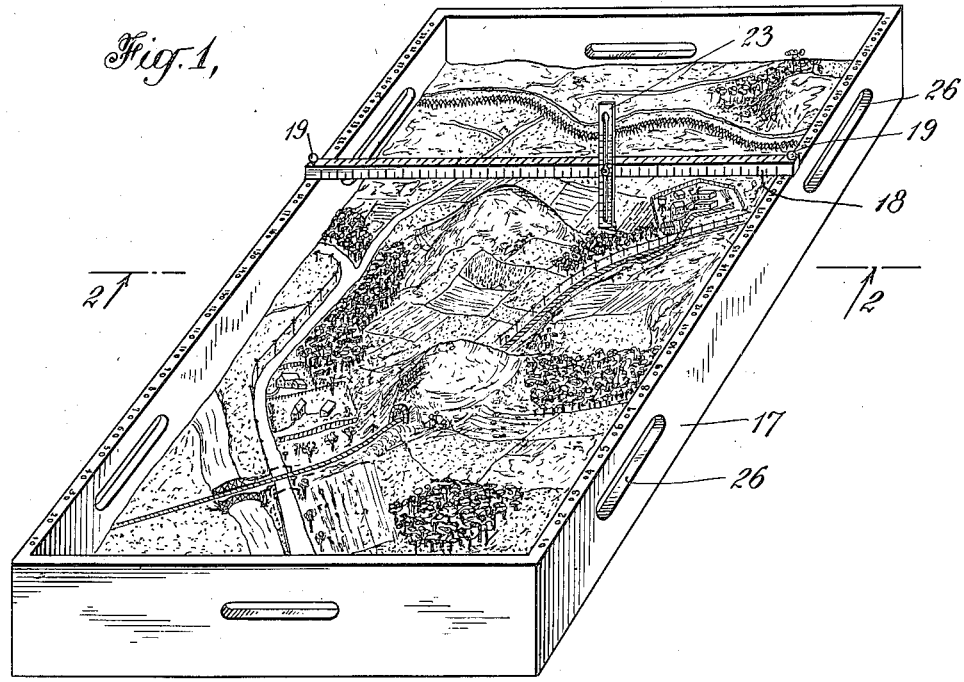
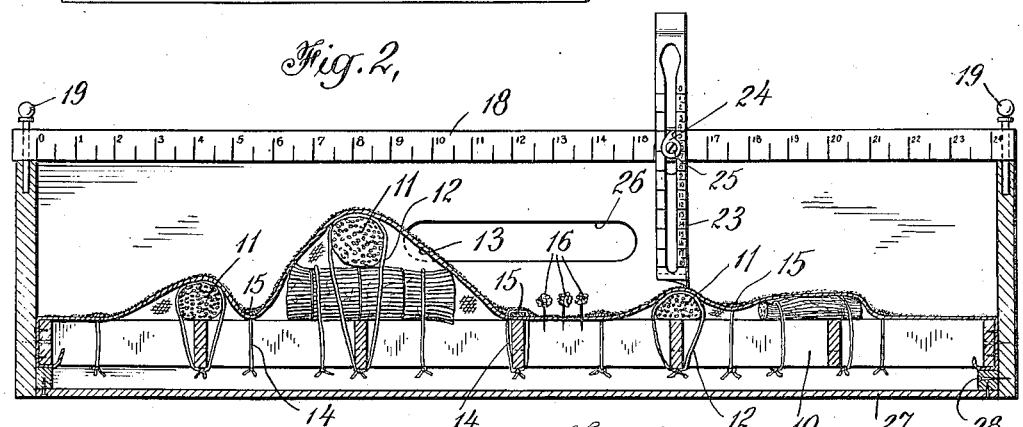
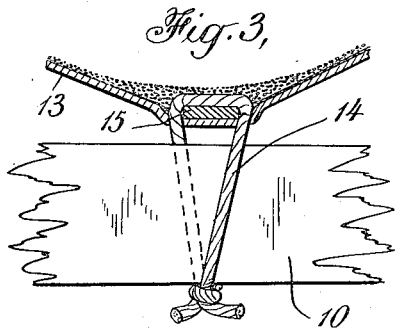
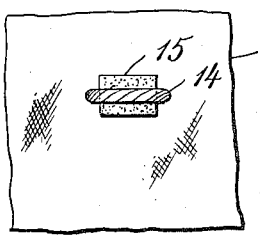
INVENTOR
M. Gerashshenevsky
BY
Pennie Davis Marvin & Edmonds
ATTORNEYS

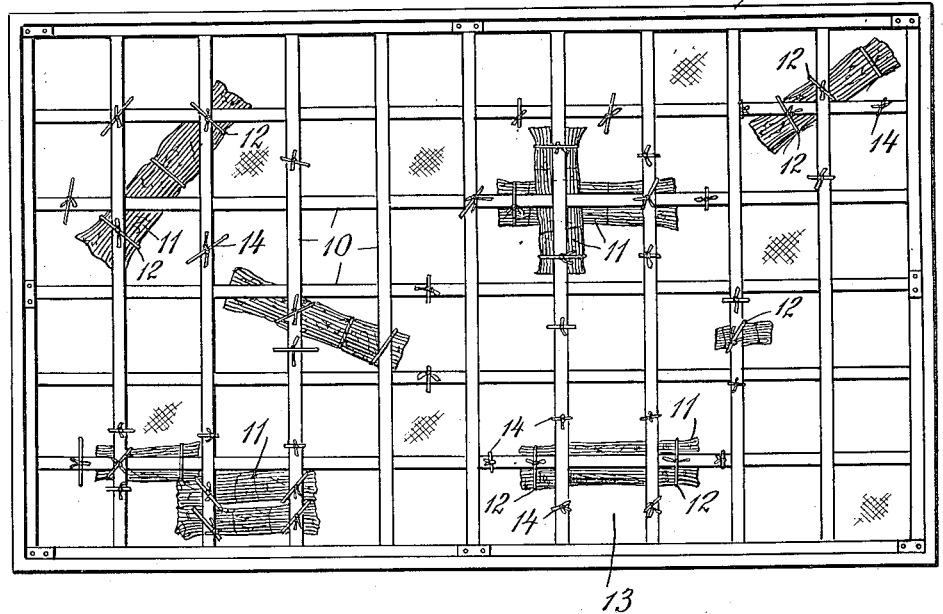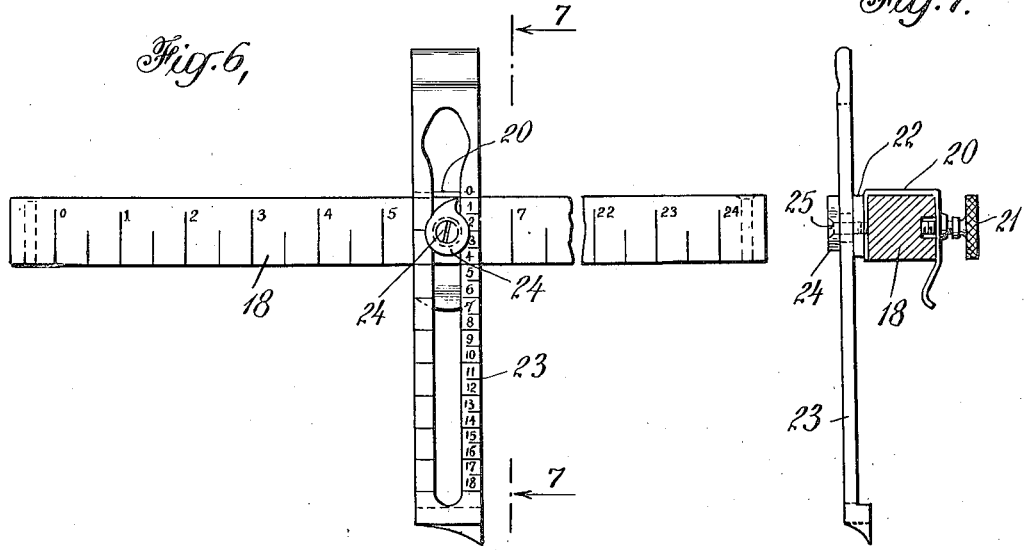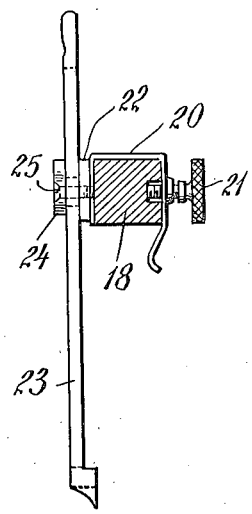

UNITED STATES PATENT OFFICE.

MICHEL GERASHSHENEVSKY, OF NEW YORK, N. Y.

RELIEF-MAP.

1,278,632.	Specification of Letters Patent.	Patented Sept. 10, 1918.

Application filed March 5, 1918.   Serial No. 220,496.

*To all whom it may concern:*

Be it known that I, MICHEL GERASH-SHENEVSKY, a citizen of Russia, residing at 237 West 108th street, in the county of New York, State of New York, have invented certain new and useful Improvements in Relief-Maps; and I do hereby declare the following to be a full, clear, and exact description of the invention, such as will enable others skilled in the art to which it appertains to make and use the same.

The present invention relates to relief or contour maps and to adjuncts useful in the construction of such maps, or in the reading of distances and elevations thereon after the map is complete.

While the present invention has its greatest utility for war purposes, it can be used in other ways as by architects and landscape gardeners.

In the embodiment hereinafter described in detail all of the elements of the map are light in weight, are easily obtainable, and can be quickly assembled, and as the result, the map and its adjuncts can readily be set up for the assistance of artillery officers in controlling the fire of their guns, and for like purposes which readily suggest themselves.

In the accompanying drawing—

Figure 1 is a perspective view of a complete map with measuring means in position for determining the altitude or location of any point on the map;

Fig. 2 is a sectional elevation on the line 2—2 of Fig. 1;

Fig. 3 is a detail showing how the flexible cloth face of the map is anchored with wire to the foundation or grid;

Fig. 4 is a plan view of the loop of the wire illustrated in Fig. 3;

Fig. 5 shows the grid and its padding as viewed from beneath;

Fig. 6 is an elevation, and

Fig. 7 is a transverse section of the horizontal measuring bar or support on which the vertically adjustable pointer is carried.

Referring to Fig. 2, the map comprises a rigid back or grid 10 preferably composed of wood strips mortised together in checker board fashion to insure rigidity with light weight. This grid may be rectangular in outline as illustrated, or may have any desired configuration.

On top of the grid is a padding preferably consisting of bundles 11 of straw or any similar waste material accessible in a field of military operations, these bundles being distributed over the grid and stacked one above another, where necessary, to imitate in a crude manner the undulations of the ground work of the map. The bundles are fastened to the grid by loops 12 of wire, cord or the like as illustrated.

Over the padded face of the grid is then stretched somewhat loosely a face or sheet 13 of flexible material such as canvas or other cloth. The edges of the flexible face are wrapped down around the edges of grid 10 and there tacked in position as illustrated.

As a means for giving a more exact contour to the flexible face, there are provided loops 14 of wire (Fig. 3) which are passed through the cloth face with a pad of leather 15 (Fig. 4) underneath to prevent tearing of the cloth. These are pulled down through the grid for such a distance as will give to the cloth above a proper elevation or altitude. The ends of the wire loop are then twisted together (Fig. 3) and thus securely hold the sheet of cloth in its adjustable position.

By going over the map and putting in these flexible fastening means wherever required, the cloth surface can be pulled down over the padding or bundles until the desired form of ground work is ultimately attained.

The cloth face is next given a heavy coating of glue or similar adhesive painted on generously, and while the glue is still fresh, sand or like earthy material is sifted over the map and becomes embedded in the glue. The surface is then allowed to dry and the excess sand poured off. This leaves a surface stiff enough to retain its shape, but yielding enough to withstand rough handling and even abuse.

Facsimiles of buildings, trees, bridges and the like, each preferably mounted on a pin, can then be assembled on the map, the pins being thrust into the cloth as indicated diagrammatically by the three trees 16 of Fig. 2. The holes thus made by the pins do not seriously mar the surface of the map and the pins may be withdrawn and the facsimile shifted about as occasion may require without destroying the good appearance of the ground work. The ground work or face may be painted or otherwise ornamented to illustrate roadways, rivers, fields and the like.

In the embodiment illustrated, the relief map is housed in a rectangular wooden frame 17, two sides of which are bored with vertical holes along the top edges. These holes are spaced equidistant from one another and are numbered consecutively from one end of the frame to the other. Bridging the frame and coöperating therewith to form a measuring means is a bar 18 provided along it top and along one side with a scale, and provided at its ends with holes through which are passed wooden plugs 19 (Fig. 2) which are received in the holes bored in the top of frame 17.

Mounted to slide longitudinally on this bar or support 18 is a carriage comprising a plate 20 (Fig. 7) a set screw 21 taking into a longitudinal groove on the back side of bar 18, and a front plate 22 to which is adjustably clamped a slotted pointer 23. The pointer is held under the edges of a head 24 by means of a screw 25.

Sight openings 26 (Fig. 1) may be arranged along the sides and ends of the completed map through which an observer may attain a relatively correct view of the lay of the ground from any given direction.

To read the altitude or location of any point on the map, it is only necessary to bring pointer 23 in contact with the point, and then to read the scale marking on the pointer on its supporting bar 18 and on the edges of frame 17. This measuring arrangement is similarly of utility when the map is being made, for the pointer can be used to indicate when the flexible face has been drawn down by the wires into just the right conformation.

In the embodiment illustrated, the frame 17 is closed at the bottom by a sheet 27 of cardboard or thin wood tacked to strips 27 on which the grid 10 of the map is seated.

The map complete with its measuring adjuncts, is very light and inexpensive, and the map can be made and re-made with great rapidity and at low cost. All of the materials are easily available and easily manipulated and yet the finished map can be of great reliability and value in military operation.

I am aware that various changes in form, in shape and in details may be made without departing from the spirit of my invention as defined by the appended claims.

I claim:

1. In a relief map, the combination of a grid, padding thereon, a flexible face for said padding conforming to the desired contour and flexible fastening means passed through said face and tying it to said grid, substantially as described.

2. In a relief map, the combination of a rigid back, padding thereon, a cloth face for said padding, means tying said cloth to said grid and holding the cloth to the desired contour, an adhesive on said cloth, and earthy material held by said adhesive.

3. In a relief map, the combination of a rigid back, padding thereon, a cloth face for said padding, means tying said cloth to said grid and holding the cloth to the desired contour, an adhesive on said cloth, earthy material held by said adhesive, and facsimiles mounted on pins stuck through said cloth.

4. The combination with a relief map, of a frame therefor, a support adjustable along said frame, a vertical pointer adjustable along said support and also vertically, and scale marking on said frame, said support and said pointer to determine the elevation and relative position of points on said map, substantially as described.

5. The combination with a relief map, of a frame therefor, having holes equally spaced along its upper edge, a support adjustable along said frame and having plugs to fit in said holes, a slotted pointer adjustable along said support and also vertically, scale markings on said support and said pointer, and means for adjustably clamping said pointer to said support.

In testimony whereof I affix my signature.

MICHEL GERASHSHENEVSKY.